April 7, 1936.    G. STORAASLI    2,036,655
CHRISTMAS TREE LAMP SOCKET HOLDER
Filed July 17, 1934
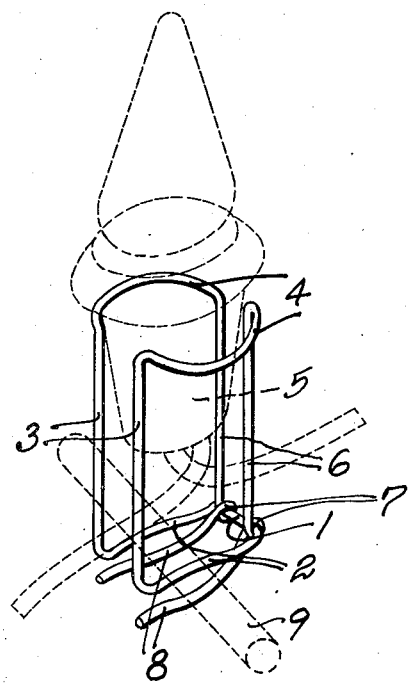
Fig. 1
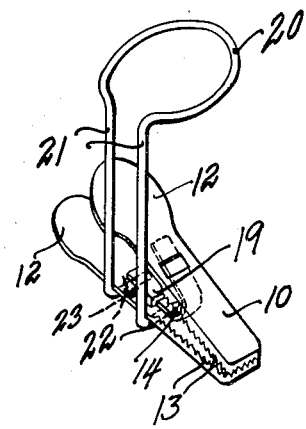
Fig. 2
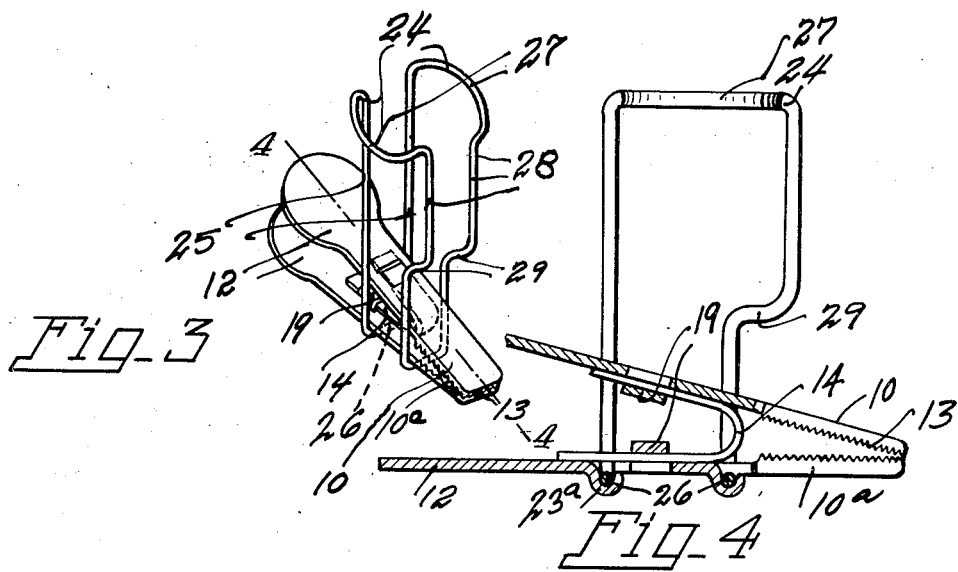
Fig. 3
Fig. 4
INVENTOR.
GEORGE STORAASLI
BY Glenn L. Fish
ATTORNEY Patented Apr. 7, 1936

2,036,655

UNITED STATES PATENT OFFICE 2,036,655

CHRISTMAS TREE LAMP SOCKET HOLDER

George Storaasli, Spokane, Wash.

Application July 17, 1934, Serial No. 735,614

3 Claims. (Cl. 24—81)

This invention relates to an improved holder for Christmas tree lamp sockets and one object of the invention is to provide a holder which can be easily and quickly applied to a limb of a tree or removed therefrom and which includes jaws extending upwardly from a tree engaging clamp in such position that a lamp socket when applied will be firmly held between the jaws in an upright position.

Another object of the invention is to so form the socket engaging jaws that they will have sufficient resiliency to have binding engagement with the sockets and prevent the sockets from moving out of their proper positions.

Another object of the invention is to provide a device of this character wherein the socket engaging jaws are formed from a single strand of resilient material, the said jaws being either secured to a tree engaging clamp formed separate from the socket engaging jaws or from portions of the resilient strand.

Another object of the invention is to provide a lamp holder which is simple in construction, cheap to manufacture and very efficient in use.

The improved lamp holder is illustrated in the accompanying drawing wherein:

Figure 1 is a perspective view of one embodiment of the invention wherein the socket engaging jaws and tree engaging jaws are formed from a strand of resilient wire.

Figure 2 is a perspective view of a modified construction wherein the tree engaging clamp is formed of sheet metal and the socket engaging element anchored to one member of the tree engaging clamp.

Figure 3 is a perspective view of another modified form of the invention.

Figure 4 is an enlarged sectional view taken along the line 4—4 of Figure 3.

The improved lamp holder illustrated in Figure 1 is formed from a strand of resilient wire and this wire is bent intermediate its length to form a bridge 1 from ends of which extend portions constituting upper jaws 2 of a tree engaging clamp. These jaws are bowed upwardly to fit over the limb of a tree and conform to the transverse curvature thereof. From ends of the jaws 2 the wire is bent upwardly to form side arms 3 of jaws forming a socket engaging clamp and then bent to form bridge portions 4 which are bowed outwardly to fit about a bulb receiving socket 5 indicated by dotted lines. After forming the bridges the wire is then bent downwardly to form side arms 6 of the socket engaging jaws and ends of the wire are then coiled about the bridge 1 as shown at 7 to firmly unite the jaws to the bridge and provide springs for lower jaws 8 of the tree engaging clamp. These jaws 8 are bowed downwardly and when a tree limb 9 is engaged between the jaws 2 and 8 the holder will be firmly held in an upright position. The jaws of the socket engaging clamp are disposed for movement in a horizontal plane whereas the jaws of the limb engaging clamp move in a vertical plane and therefore the socket engaging jaws can be actuated without causing the limb engaging jaws to loose their grip upon the tree. It should also be noted that when a lamp socket is fitted between the jaws of the socket engaging clamp the wires of the socket may extend in opposite directions from the clamp between the jaws thereof and assist in balancing the support in an upright position.

The device illustrated in Figure 2 is somewhat different in its construction from that shown in Figure 1 and consists of limb engaging jaws 10 formed of sheet metal having handle extensions 12 and along their sides and front ends being formed with serrated flanges 13 which will bight into a tree limb and firmly hold the device in place thereon. The jaws 10 are connected by a U-shaped spring 14 extending longitudinally of the jaws between the same with its arms extending towards the handles and engaged through tongues 19 struck inwardly from the strips of sheet metal and extending transversely thereof. The arms of the spring may be secured by solder after being passed through the tongues or friction may be depended upon to hold the spring in place. The socket engaging element of this holder is formed of resilient wire bent to provide a socket encircling loop 20 having depending arms 21, the lower ends of which are bent to form feet 22 extending under the lower limb engaging jaw and passed through tongues 23 struck downwardly from this jaw and extending longitudinally thereof. By this arrangement the bulb engaging element will be supported in an upright position over the limb engaging clamp and when a socket is fitted into the loop 20 it will be firmly gripped by the loop and supported.

In Figure 3 the tree engaging clamp is of the same construction as that shown in Figure 2 and therefore it is not necessary to repeat the detailed description thereof. The socket engaging element is of a different construction and consists of jaws 24 formed from a strand of resilient wire. This wire strand is bent to form side arms 25 connected by a bridge 26 engaged through one of the tongues 23ª of the lower jaw 10ª of the tree engaging clamp and the wire is then bent to form bridges 27 which are curved or bowed outwardly to fit about a lamp socket. Arms 28 extend downwardly from the bridges 27 and have their lower ends bent to provide portions engaged through the other tongue 23a of the tree engaging clamp. It should be noted that in this embodiment of the invention the side arms 28 of the socket engaging clamp are bent as shown at 29 to provide offset upper and lower portions for these arms and permit the limb engaging jaws to be readily separated a sufficient distance to firmly grip a tree limb.

Having thus described the invention, what is claimed as new is:

1. A holder for tree lights comprising a limb engaging clamp having upper and lower jaws formed of sheet metal and each having a jaw portion and a handle portion, a U-shaped spring extending longitudinally between said jaws, the strips forming the jaws having tongues struck inwardly therefrom and engaging across arms of the spring to connect the jaws with the spring, and means carried by one jaw and extending upwardly therefrom for engaging a lamp socket and supporting the socket in an upright position over the tree engaging clamp.

2. A holder for tree lights comprising a limb engaging clamp having upper and lower horizontally extending limb engaging jaws movable towards and away from each other and yieldably held in a limb engaging position, and a socket engaging element consisting of a strand of resilient wire bent intermediate its length to form a socket receiving loop and arms depending from the loop and having their lower ends bent to form feet extending inwardly and fixed to one jaw of the limb engaging clamp.

3. A holder for tree lights comprising a limb engaging clamp having upper and lower horizontal jaws movable towards and away from each other, one jaw having tongues struck therefrom, and a socket engaging clamp consisting of a strand of resilient wire bent to form a pair of jaws straddling the limb engaging clamp and extending upwardly therefrom, the jaws of the socket engaging clamp each having an upper bridge and side arms depending therefrom and connected with the side arms of the companion jaw by bridge portions extending transversely of the jaws of the tree engaging socket and overlapped by said tongues to secure the socket engaging clamp to the tree engaging clamp, certain of the side arms of the socket engaging clamp being bent intermediate the height of the clamp to provide offset upper and lower portions whereby the tree engaging jaws may be freely opened.

GEORGE STORAASLI.